United States Patent
Aggarwal et al.

(10) Patent No.: US 12,427,601 B2
(45) Date of Patent: Sep. 30, 2025

(54) OPTICAL FIBER CONNECTOR FOR ADDITIVE MANUFACTURING SYSTEMS

(71) Applicant: VulcanForms Inc., Devens, MA (US)

(72) Inventors: Raghav Aggarwal, Somerville, MA (US); Martin C. Feldmann, Sudbury, MA (US)

(73) Assignee: VulcanForms Inc., Devens, MA (US)

( * ) Notice: Subject to any disclaimer, the term of this patent is extended or adjusted under 35 U.S.C. 154(b) by 0 days.

(21) Appl. No.: 18/593,301

(22) Filed: Mar. 1, 2024

(65) Prior Publication Data

US 2024/0198454 A1 Jun. 20, 2024

Related U.S. Application Data

(62) Division of application No. 16/884,432, filed on May 27, 2020, now Pat. No. 11,951,565.

(Continued)

(51) Int. Cl.
*B23K 26/34* (2014.01)
*B23K 26/354* (2014.01)
(Continued)

(52) U.S. Cl.
CPC ............ *B23K 26/34* (2013.01); *B23K 26/354* (2015.10); *B33Y 30/00* (2014.12); *B33Y 99/00* (2014.12);
(Continued)

(58) Field of Classification Search
CPC ...... B23K 26/34; B23K 26/354; B33Y 30/00; B33Y 99/00; G02B 6/4428; G02B 6/43; G02B 6/4415
See application file for complete search history.

(56) References Cited

U.S. PATENT DOCUMENTS 5,660,748 A 8/1997 Tanaka et al.
5,999,554 A 12/1999 Marshall
(Continued)

FOREIGN PATENT DOCUMENTS

CN 101861515 A 10/2010
CN 105531612 A 4/2016
(Continued)

OTHER PUBLICATIONS

International Search Report and Written Opinion for International Application No. PCT/US2020/034656, mailed Aug. 27, 2020.
(Continued)

*Primary Examiner* — Peter Radkowski
(74) *Attorney, Agent, or Firm* — Wolf, Greenfield & Sacks, P.C.

(57) ABSTRACT

Disclosed embodiments relate to additive manufacturing systems. In some embodiments, an additive manufacturing system may include a plurality of laser energy sources, an optics assembly configured to direct laser energy onto a build surface, and an optical fiber connector positioned between the plurality of laser energy sources and the optics assembly. A first plurality of optical fibers may extend between the plurality of laser energy sources and the optical fiber connector, and a second plurality of optical fibers may extend between the optical fiber connector and the optics assembly. Each optical fiber of the first plurality of optical fibers may be coupled to a corresponding optical fiber of the second plurality of optical fibers within the optical fiber connector.

21 Claims, 4 Drawing Sheets

Related U.S. Application Data

(60) Provisional application No. 62/853,411, filed on May 28, 2019.

(51) Int. Cl.
| | |
|---|---|
| *B33Y 30/00* | (2015.01) |
| *B33Y 99/00* | (2015.01) |
| *G02B 6/42* | (2006.01) |
| *G02B 6/43* | (2006.01) |
| *G02B 6/44* | (2006.01) |

(52) U.S. Cl.
CPC ............. *G02B 6/4228* (2013.01); *G02B 6/43* (2013.01); *G02B 6/4415* (2013.01)

(56) References Cited

U.S. PATENT DOCUMENTS

| | | | |
|---|---|---|---|
| 6,327,291 | B1 | 12/2001 | Marshall |
| 6,485,189 | B1* | 11/2002 | Gilliland ............. G02B 6/4246 385/59 |
| 6,538,231 | B2 | 3/2003 | Karube et al. |
| 6,603,780 | B2 | 8/2003 | Miyai |
| 6,769,812 | B1 | 8/2004 | Handforth et al. |
| 6,807,204 | B1 | 10/2004 | O'Dowd |
| 7,048,528 | B2 | 5/2006 | Ishikawa et al. |
| 7,630,609 | B1 | 12/2009 | Mays, Jr. et al. |
| 8,160,451 | B2 | 4/2012 | Liu et al. |
| 9,366,829 | B2 | 6/2016 | Czosnowski et al. |
| 9,841,571 | B1 | 12/2017 | Momtahan |
| 9,956,612 | B1 | 5/2018 | Redding et al. |
| 10,007,072 | B1 | 6/2018 | Momtahan |
| 10,012,810 | B2 | 7/2018 | Sanders |
| 10,022,795 | B1 | 7/2018 | Redding et al. |
| 10,335,901 | B2 | 7/2019 | Ferrar et al. |
| 11,117,218 | B2 | 9/2021 | Vorontsov |
| 11,951,565 | B2 | 4/2024 | Aggarwal et al. |
| 2003/0210861 | A1* | 11/2003 | Weiss ................... G02B 6/4292 385/59 |
| 2005/0179772 | A1 | 8/2005 | Ishikawa et al. |
| 2008/0193140 | A1 | 8/2008 | Liu et al. |
| 2011/0133101 | A1 | 6/2011 | Viellerobe et al. |
| 2013/0259429 | A1* | 10/2013 | Czosnowski ........ G02B 6/3879 385/78 |
| 2015/0314528 | A1 | 11/2015 | Gordon |
| 2015/0314532 | A1 | 11/2015 | Gordon |
| 2015/0331181 | A1 | 11/2015 | Chen et al. |
| 2016/0054216 | A1 | 2/2016 | Sokol et al. |
| 2016/0079724 | A1 | 3/2016 | Reeves-Hall et al. |
| 2016/0124149 | A1 | 5/2016 | Chen et al. |
| 2016/0158889 | A1 | 6/2016 | Carter et al. |
| 2016/0228988 | A1 | 8/2016 | Dallarosa et al. |
| 2016/0368050 | A1 | 12/2016 | Morris et al. |
| 2017/0021454 | A1 | 1/2017 | Dallarosa et al. |
| 2017/0021455 | A1* | 1/2017 | Dallarosa ................ B22F 12/41 |
| 2017/0056975 | A1 | 3/2017 | Carter et al. |
| 2017/0329092 | A1* | 11/2017 | Sanders ............... G02B 6/3814 |
| 2018/0161873 | A1 | 6/2018 | Brown et al. |
| 2018/0200792 | A1 | 7/2018 | Redding et al. |
| 2018/0207722 | A1 | 7/2018 | Feldmann et al. |
| 2018/0214951 | A1 | 8/2018 | Koponen et al. |
| 2018/0236549 | A1 | 8/2018 | Spears et al. |
| 2018/0335580 | A1 | 11/2018 | Lohse et al. |
| 2019/0009358 | A1 | 1/2019 | Vorontsov |
| 2019/0009369 | A1 | 1/2019 | Vorontsov |
| 2019/0039172 | A1 | 2/2019 | Grapov |
| 2019/0143406 | A1 | 5/2019 | Carter et al. |
| 2019/0262949 | A1 | 8/2019 | Malinowski et al. |
| 2019/0299286 | A1 | 10/2019 | Feldmann et al. |
| 2020/0039000 | A1 | 2/2020 | Sweetland |
| 2020/0108465 | A1 | 4/2020 | Sweetland |
| 2020/0376600 | A1 | 12/2020 | Aggarwal et al. |
| 2020/0376761 | A1 | 12/2020 | Sweetland |
| 2021/0339318 | A1 | 11/2021 | Dunbar et al. |
| 2021/0362272 | A1 | 11/2021 | Vorontsov |
| 2022/0009030 | A1 | 1/2022 | Dadelszen et al. |
| 2023/0056367 | A1 | 2/2023 | Leonardo et al. |

FOREIGN PATENT DOCUMENTS

| | | |
|---|---|---|
| CN | 107635749 A | 1/2018 |
| CN | 109375380 A | 2/2019 |
| CN | 208637788 U | 3/2019 |
| CN | 114769620 A | 7/2022 |
| DE | 102 019 003 528 A1 | 11/2019 |
| EP | 2 857 878 A1 | 4/2015 |
| JP | 2003-154477 A | 5/2003 |
| JP | 2003-340924 A | 12/2003 |
| JP | 2006-184343 A | 7/2006 |
| JP | 2006-208755 A | 8/2006 |
| JP | 2010-036189 A | 2/2010 |
| JP | 2016-507377 A | 3/2016 |
| JP | 2017-097016 A | 6/2017 |
| JP | 2018-518601 A | 7/2018 |
| WO | WO 03/016975 A2 | 2/2003 |
| WO | WO 2016/201309 A1 | 12/2016 |
| WO | WO 2017/009468 A1 | 1/2017 |
| WO | WO 2018/087218 A1 | 5/2018 |
| WO | WO 2019/048612 A1 | 3/2019 |

OTHER PUBLICATIONS

[No Author Listed], Fiber to Photodiode Couplers. OzOptics.com, Data Sheet, DT80025, 1999; 3 pages.

[No Author Listed], Laser Beam Delivery by Fiber—A Primer. Coherent White Paper. Feb. 8, 2019; 7 pages. https://www.optoscience.com/maker/coherent/beam-delivery/pdf/COHR_WhitePaper_template_2_08_2019.pdf.

Vorontsov et al., Comparative efficiency analysis of fiber-array and conventional beam director systems in vol. turbulence. Appl. Opt., 2016 My 20;55(15):4170-85.

Zavala-Arredondo et al., Laser diode area melting for high speed additive manufacturing of metallic components, Materials and Design 2017;117:305-15.

Zeng et al., Optical Fiber Communication Technology and Equipment. Textbook published by Xian Electronic Technology University Press. Jan. 31, 2019; V3; pp. 83-84.

* cited by examiner

OPTICAL FIBER CONNECTOR FOR ADDITIVE MANUFACTURING SYSTEMS

RELATED APPLICATIONS

This patent is a divisional of U.S. patent application Ser. No. 16/884,432, filed May 27, 2020, which claims priority under 35 U.S.C. § 119(e) of U.S. Provisional Application No. 62/853,411, filed May 28, 2019, each of which is hereby incorporated by reference in their entireties.

FIELD

Disclosed embodiments are related to additive manufacturing systems including optical fibers, as well as optical fiber connectors for use in such systems.

BACKGROUND

Powder bed fusion processes are an example of additive manufacturing processes in which a three-dimensional shape is formed by selectively joining material in a layer-by-layer process. In metal powder bed fusion processes, one or multiple laser beams are scanned over a thin layer of metal powder. If the various laser parameters, such as laser power, laser spot size, and/or laser scanning speed are in a regime in which the delivered energy is sufficient to melt the particles of metal powder, one or more melt pools may be established on a build surface. The laser beams are scanned along predefined trajectories such that solidified melt pool tracks create shapes corresponding to a two-dimensional slice of a three-dimensional printed part. After completion of a layer, the powder surface is indexed by a defined distance, the next layer of powder is spread onto the build surface, and the laser scanning process is repeated. In many applications, the layer thickness and laser power density may be set to provide partial re-melting of an underlying layer and fusion of consecutive layers. The layer indexing and scanning is repeated multiple times until a desired three-dimensional shape is fabricated.

Both single laser and multi-laser systems are used. Some systems use a pair of galvanometer mounted mirrors to scan each laser beam over the desired pattern on the build surface. Some systems use motion stages to scan the laser over the build surface. Some systems use a combination of motion stages and galvanometers to scan the laser over the build surface. Systems that use galvanometers as part of the scanning method often use f-theta or telecentric lens to help keep the incident angle of the laser beam onto the build surface as close to perpendicular as possible for a given build surface size. The spacing between the final optical component of any laser path (e.g., final optics, galvanometer, mirror, telecentric lens or f-theta lens) may be on the order of a few millimeters up to a hundred or more centimeters.

SUMMARY

In one embodiment, an additive manufacturing system comprises a plurality of laser energy sources, an optics assembly configured to direct laser energy from the plurality of laser energy sources onto a build surface to form an array of laser energy spots on the build surface, an optical fiber connector, and a first plurality of optical fibers extending between the plurality of laser energy sources and the optical fiber connector. Each optical fiber of the first plurality of optical fibers is coupled to a laser energy source of the plurality of laser energy sources. The system further comprises a second plurality of optical fibers extending between the optical fiber connector and the optics assembly, and each optical fiber of the second plurality of optical fibers is coupled to an optical fiber of the first plurality of optical fibers within the optical fiber connector.

In another embodiment, a method of exchanging optical fibers in an additive manufacturing system comprises decoupling a first plurality of optical fibers from an optical fiber connector. The first plurality of optical fibers extends between the optical fiber connector and an optics assembly of an additive manufacturing system. The method further comprises decoupling the first plurality of optical fibers from the optics assembly, coupling a plurality of replacement optical fibers to the optical fiber connector such that each of the plurality of replacement optical fibers is coupled to a coupled to a laser energy source of a plurality of laser energy sources coupled to the optical fiber connector, and coupling the plurality of replacement optical fibers to the optics assembly.

In a further embodiment, a method of exchanging a laser energy source in an additive manufacturing system comprises decoupling a first optical fiber from a first connection on optical fiber connector. Prior to decoupling, the first optical fiber extends between a laser energy source of a plurality of energy sources and the optical fiber connector. The method further comprises coupling a second optical fiber coupled to a replacement laser energy source to the first connection on the optical fiber connector. After coupling, the second optical fiber is coupled to a third optical fiber of a plurality of optical fibers extending between the optical fiber connector and an optics assembly of an additive manufacturing system.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
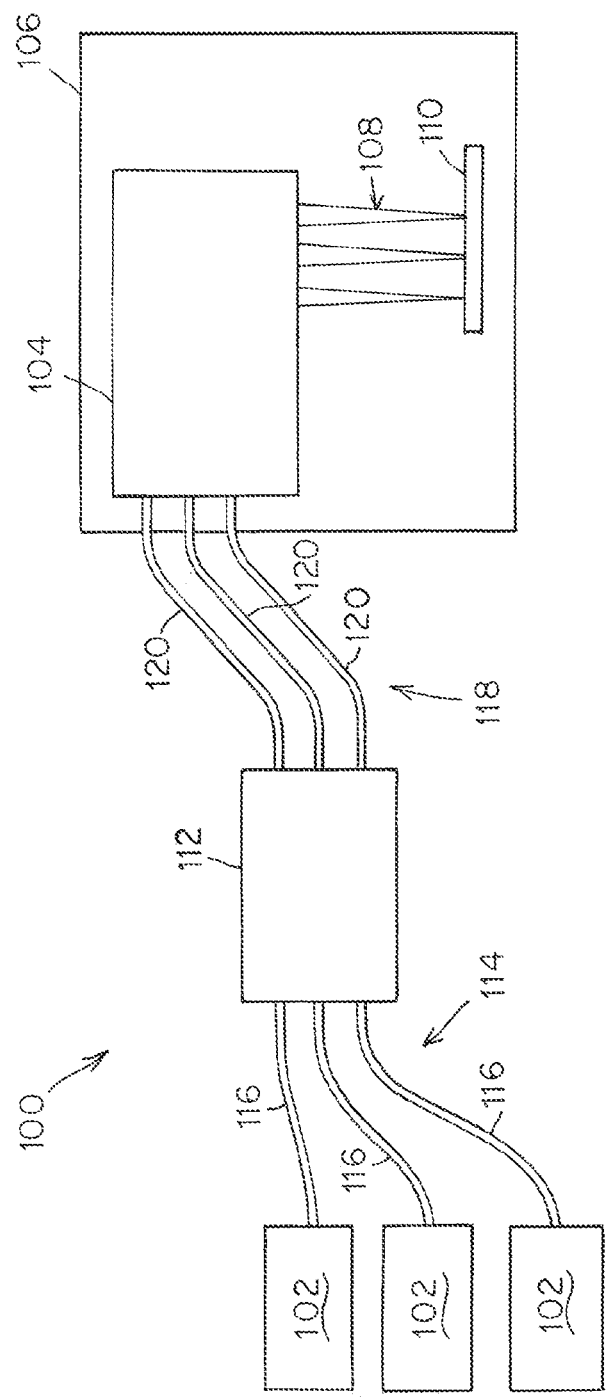
FIG. 1 is a schematic representation of an additive manufacturing system, according to one embodiment.

The inventors have recognized and appreciated that the manufacturing speed and throughput of additive manufacturing systems such as powder bed fusion systems is limited by the rate at which the powdered material can be fused. The rate of material fusion is dependent on multiple factors, including the total power delivered to the powdered material in the build volume of the system, as well as the energy per unit mass required to fuse the powdered material. In some instances, such as in systems utilizing one or more laser energy sources to deliver power to the build volume, the rate of fusion may be increased by increasing the power level of the one or more laser energy sources. However, the extent to which the power level of the individual laser energy sources can be increased is limited by the process physics of laser fusion. For example, when the power level and scan speed are increased above critical limits, Rayleigh instability of the melt pool can occur, leading to defects in the manufactured parts. Accordingly, the inventors have recognized numerous associated with additive manufacturing system include a plurality of laser energy sources that are each operated at power levels below such critical levels. For example, by increasing the number of laser energy sources that can simultaneously fuse powder in a powder bed fusion process, the total power delivered to the build volume may be increased, and thus the rate of fusion can be increased. However, the inventors have also appreciated that increasing the number of laser energy sources can lead to reduced reliability of the system. For example, as the number of laser energy sources in a system is increased, the probability one or more of the laser energy sources and/or laser energy delivery mechanisms will fail in a given time period increases. As a result, the probability that no laser energy sources and/or laser energy delivery mechanisms will fail within a given time period can decrease substantially. In some instances, failure of such components of an additive manufacturing system can lead to reduced productivity and/or throughput of the system, and/or failure of a manufacturing process.

Additionally, the inventors have appreciated that additive manufacturing systems utilizing optical fibers to deliver laser energy from one or more laser energy sources to powder in a build volume can present additional challenges. For example, in some instances, core diameters of the optical fibers used in an additive manufacturing system may be between about 10 µm and about 50 µm, and a divergence angle of light exiting the cores of the optical fibers may be between about 0.3 degrees and about 1.5 degrees. These small core diameters and divergence angles can present challenges in coupling light (e.g., laser energy) into and out of the optical fibers since most of the light being coupled into the optical fiber needs to be focused onto a spot smaller than the core diameter, and the light needs to be focused into the optical fiber with a divergence angle less than that of the optical fiber. Light that is not properly focused into the core of the optical fiber can escape into the cladding of the optical fiber surrounding the core, which can lead to undesirable losses in the power transmission efficiency and/or heating of the optical fiber. Moreover, the exit surfaces of the optical fibers must be precisely positioned and aligned with respect to optical elements (e.g., lenses) following the optical fiber. Similar to the above, misalignment of the exit surfaces with respect to such optical elements may lead to undesirable losses in power transmission efficiency and/or heating of the optical elements or other components of the system.

In some instances, such stringent requirements related to alignment and positioning of optical fibers in an additive manufacturing system can make replacement of laser energy sources and/or optical fibers difficult and/or time consuming. For example, upon the failure of a laser energy source, a replacement laser energy source must be coupled to an existing optical fiber, which requires careful alignment of the interface between the laser energy source and the optical fiber. As another example, upon the failure of an optical fiber or optical fiber cable comprising multiple optical fibers, the failed fiber or cables must be removed, and the replacement fiber or cable must be aligned at multiple interfaces, including between each laser energy sources and each optical fiber, and between each optical fiber and an optics assembly of the additive manufacturing system (e.g., which may be configured to direct laser energy from the optical fibers towards a build surface within a build volume).

The inventors have recognized and appreciated that existing approaches for coupling and aligning optical fibers may not be well suited for some additive manufacturing systems such as laser powder bed fusion systems including a plurality of laser energy sources. For example, while commercially available high power laser couplers, such as QBH and LLK connectors may allow or rapid coupling and decoupling of individual optical fibers to an optics assembly of a system, such connectors may not be suitable as the number of laser energy sources is increased for multiple reasons. First, these types of connectors typically have a large footprint that is much larger than the size of the optical fibers; for instance, a flange diameter of a connector may be between about 20-50 mm for optical fibers on the order of 10-50 µm. As a result, an additive manufacturing system utilizing even a modest number of laser energy sources (e.g., greater than 10 laser energy sources) would require an unduly large optics assembly in an additive manufacturing system, which may inhibit or prevent movement of the optics assembly within a build volume. Second, such existing connectors typically exhibit transmission inefficiencies of about 1-3%, and thus require cooling (e.g., water cooling) to avoid overheating; these cooling requirements lead to additional bulk for each connector. Such size limitations would be further exacerbated as the number of laser energy sources is further increased, such as to hundreds or thousands of laser energy sources. Moreover, these types of conventional connectors require manual alignment each time an optical fiber is decoupled and recoupled to the optics assembly, which would lead to time-consuming and substantial disruption of a manufacturing process. For example, replacement of a failed optical fiber during a manufacturing process would require cancellation of the process to allow access the optics assembly within the build volume of the system, which may require purging of a desired gas environment maintained in the build volume during the manufacturing process (e.g., an inert gas environment). In addition to the above, the inventors have recognized that other types of existing optical fiber connectors, such as those used in telecommunications and related applications, are designed for power levels that are orders of magnitude lower than those required for additive manufacturing systems, and thus those types of connectors are also not suitable for use in additive manufacturing systems.

In view of the foregoing, the inventors have recognized and appreciated numerous advantages associated with additive manufacturing systems that include a large number of laser energy sources and that also facilitate simple and fast replacement of various components of the system such as laser energy sources, optical fibers, and/or optical fiber cables containing a plurality of optical fibers. For example, the systems and methods described herein may allow such components to be replaced upon failure without significant disruption to a build process being performed by the additive manufacturing system and may reduce the system down time required for maintenance to replace the failed components. Moreover, as described in more detail below, in some embodiments, the systems and methods described herein may facilitated replacement of one or more failed components, such as laser energy sources, without requiring access to an optics assembly within a build volume of the system. In some instances, such failed components may be replaced without substantially impacting an ongoing manufacturing process.

In one embodiment, an additive manufacturing system may include a plurality of laser energy sources and an optics assembly configured to direct laser energy from the plurality of laser energy sources onto a build surface. Exposure of the laser energy to powdered material on the build surface may be used to fuse at least a portion of the powder to form a desired geometry on the build surface. In some instances, the optics assembly may be configured to form an array of laser energy spots on the build surface from the laser energy from each laser energy source. For example, the optics assembly may be configured to direct laser energy from each laser energy source to form one or more corresponding laser energy spots in the array. The system may further include an optical fiber connector coupled to each of the plurality of laser energy sources and the optics assembly. For example, a first plurality of optical fibers may extend between the plurality of laser energy sources and the optical fiber connector, and each optical fiber of the first plurality of optical fibers may be coupled to a corresponding laser energy source of the plurality of laser energy sources. Additionally, a second plurality of optical fibers may extend between the optical fiber connector and the optics assembly, and each optical fiber of the second plurality of optical fibers may be coupled within the optical fiber connector to a corresponding optical fiber of the first plurality of optical fibers. In this manner, laser energy from the plurality of laser energy sources may be transmitted via the first plurality of optical fibers to the optical fiber connector, and subsequently to the optics assembly via the second plurality of optical fibers such that the laser energy can be delivered to the build surface.

In some embodiments, a position of an optical fiber connector may be fixed relative to a position of a plurality of laser energy sources, and an optics assembly may be movable relative to the optical fiber connector (e.g., to move across a build surface during an additive manufacturing process). In this manner, a first plurality of optical fibers extending between the plurality of laser energy sources and the optical fiber connector may remain substantially stationary, which may provide for improved reliability and longevity of the first plurality of optical fibers. A second plurality of optical fibers extending between the optical fiber connector and the optics assembly may be movable relative to the optical fiber connector, for example, by virtue of its attachment to the movable optics assembly. The inventors have appreciated that such movement of optical fibers may in some instances lead to damage to or failure of the optical fibers. However, as described in more detail below, in some embodiments, the second plurality of optical fibers may be easily replaceable without requiring substantial effort for aligning the optical fibers. Accordingly, the additive manufacturing systems including optical fiber connectors as described herein may allow for isolation of moving optical fibers to the second plurality of optical fibers, which may be easily replaced.

While the above described embodiments include a movable second plurality of optical fibers extending between the optical fiber connector and optics assembly, it should be understood that other arrangements may be suitable in some systems. For example, some additive manufacturing systems may utilize an optics assembly that is substantially fixed in position within a build volume, and the optics assembly may include one or more components such as galvo scanners configured to direct laser energy to desired locations on a build surface.

According to some aspects, a plurality of optical fibers (e.g., a first or second plurality of optical fibers as discussed above) may be grouped into an optical fiber cable, and ends of each optical fiber within the cable may be aligned within an alignment fixture. For example, the alignment fixture may define a desired spatial distribution of the ends of the optical fibers, and may axially align each optical fiber with respect to the other optical fibers such that light traveling through the optical fibers in the cable exit the alignment fixture along a desired direction. For example, in some embodiments, the alignment fixture may be configured such that light exits each optical fiber along parallel vectors. Moreover, in some implementations, the alignment fixture may be optically polished after each optical fiber is attached to the alignment fixture such that the ends of the optical fibers held in the alignment fixture are oriented along parallel directions. Consequently, all of the optical fibers in the optical fiber cable may be aligned with other components of an additive manufacturing system (e.g., an optics assembly), by performing a single alignment operation to align the alignment fixture with the respective component. Similarly, if alignment of the optical fibers is required at both ends of the optical fibers, alignment fixtures may be provided at each end of an optical fiber cable such that the entire plurality of optical fibers in the optical fiber cable may be aligned within a system with only two alignment operations, rather than separate alignment operations for each optical fiber in the plurality of optical fibers.

In certain embodiments, an alignment fixture may include a plurality of alignment features such as v-grooves or holes to which ends of optical fibers may be bonded or otherwise attached. Depending on the particular embodiment, the alignment features may be arranged in any suitable manner to define a desired spatial distribution of the ends of the optical fibers held in the alignment fixture.

According to some embodiments, an optical fiber connector may be positioned externally from an enclosed build volume of an additive manufacturing system. For example, such external placement of an optical fiber connector may allow for one or more laser energy sources and or optical fibers extending between the laser energy sources and the optical connector to be replaced without requiring access to the enclosed build volume. In this manner, a desired gas environment may be maintained in the build volume while a laser energy source and/or optical fiber is replaced, which may reduce the system downtime associated with the replacement of the components, and in some instances, may allow for replacement of the components during a build process and/or without substantial disruption to an ongoing build process.

Additionally, the inventors have appreciated that positioning an optical fiber connector externally from a build volume may allow for large or bulky components, such as high power optical connectors and associated cooling structures (e.g., QBH and/or LLK type connectors), to be positioned outside of the build volume, where weight and size constraints may be less important. For example, in some embodiments, an optical fiber connector may include a plurality of QBH and/or LLK type connectors to allow coupling of individual optical fibers to the optical fiber connector, such as optical fibers extending between individual laser energy sources and the optical fiber connector. In other embodiments, a system may not include such high power optical connectors, and instead, optical fibers may be coupled to the optical fiber connector via a suitable optical splice structure such as a fusion splice. In such embodiments, the external positioning of the optical fiber connector may facilitate easier access to the splices compared to a system in which fiber connections are located within the build volume.

According to some embodiments, a method of replacing a laser energy source (e.g., a failed laser energy source) may include decoupling an optical fiber extending between the laser energy source and an optical fiber connector from the optical fiber connector. For example, decoupling the optical fiber may include decoupling a high power connector such as a QBH or LLK connector, or it may involve cleaving the optical fiber at an existing splice such as a fusion splice. Subsequently, a replacement optical fiber coupled to a replacement laser energy source may be coupled to the optical fiber connector, for example, via a high power connector or by splicing the replacement optical fiber to the optical fiber connector. Upon coupling to the optical fiber connector and aligning the replacement optical fiber, if needed, the replacement optical fiber may be optically coupled to another optical fiber extending between the optical fiber connector and an optics assembly of an additive manufacturing system, for example, via suitable optical elements positioned within the optical fiber connector. In this manner, a laser energy source may be replaced without requiring access to the optics assembly and/or removal of the optics assembly from an enclosure of the additive manufacturing system.

In further embodiments, a method of exchanging one or more optical fibers in an additive manufacturing system (e.g., one or more failed optical fibers) may include decoupling the one or more optical fibers from an optical fiber connector and decoupling the optical fibers from an optics assembly. Subsequently, replacement optical fibers may be coupled to each of the optical fiber connector and the optics assembly. Coupling of the replacement optical fibers to the optical fiber connector and optics assembly may include aligning the ends of the replacement optical fibers to provide a desired alignment with other components of the system. In some instances, the replacement optical fibers may be provided in a fiber cable, which may include alignment fixtures provided at the ends of the cable. In such embodiments, coupling the replacement optical fibers to the optical fiber connector and/or optics assembly may include coupling the alignment fixtures to the optical fiber connector and/or optics assembly. As noted above, such arrangements may allow many optical fibers to be coupled to and aligned with the optical fiber connector and/or optics assembly with a single coupling and alignment operation for each component. However, it should be understood that the current disclosure is not limited to systems including alignment fixtures and/or optical fiber cables. For example, in other embodiments, individual replacement optical fibers may be directly coupled to and aligned with the optical fiber connector and/or optics assembly. After replacement of the one or more optical fibers, each of the replacement optical fibers may be optically coupled to a corresponding laser energy source of a plurality of laser energy sources, for example, via suitable optical elements within the optical fiber connector.

Depending on the particular embodiment, an additive manufacturing system according to the current disclosure may include any suitable number of laser energy sources. For example, in some embodiments, the number of laser energy sources may be at least 10, at least 50, at least 100, at least 500, at least 1,000, at least 1,500, or more. In some embodiments, the number of laser energy sources may be less than 2,000, less than 1,500, less than 1,000, less than 500, less than 100, less than 50, or less than 10. Additionally, combinations of the above-noted ranges may be suitable.

Additionally, in some embodiments, a power output of each laser energy source of a plurality of laser energy sources may be between about 50 W and about 2,000 W (2 KW). For example, the power output for each laser energy source may be between about 100 W and about 1.5 kW, and/or between about 500 W and about 1 kW. Moreover, a total power output of the plurality of laser energy sources may be between about 500 W (0.5 kW) and about 4,000 kW. For example, the total power output may be between about 1 kW and about 2,000 kW, and/or between about 100 kW and about 1,000 kW.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic representation of one embodiment of an additive manufacturing system 100, including a plurality of laser energy sources 102 that deliver laser energy to an optics assembly 104 positioned within a machine enclosure 106. For example, the machine enclosure may define a build volume in which an additive manufacturing process may be carried out. In particular, the optics assembly may direct laser energy 108 towards a build surface 110 positioned within the machine enclosure to selectively fuse powdered material on the build surface. As described in more detail below, the optics assembly may include a plurality of optical elements defining an optical path within the optics assembly that may transform and/or shape and/or direct laser energy within the optics assembly such that the laser energy is directed onto the build surface as an array of laser energy pixels. The optics assembly may be movable within the machine enclosure 106 to scan the laser energy 108 across the build surface 110 during a manufacturing process.

The system 100 further includes an optical fiber connector positioned between the laser energy sources 102 and the optics assembly 104. As illustrated, a first plurality of optical fibers 114 extends between the plurality of laser energy sources 102 and the optical fiber connector 112. In particular, each laser energy source 102 is coupled to the optical fiber connector 112 via a respective optical fiber 116 of the first plurality of optical fibers 114. Similarly, a second plurality of optical fibers 118 extends between the optical fiber connector 112 and the optics assembly 104. Each optical fiber 116 of the first plurality of optical fibers 114 is coupled to a corresponding optical fiber 120 of the second plurality of optical fibers 118 within the optical fiber connector. In this manner, laser energy from each of the laser energy sources 102 is delivered to the optics assembly 104 such that the laser energy 108 can be directed onto the build surface 110 during an additive manufacturing process (i.e., a build process).

In some instances, the laser energy sources 102 and the optical fiber connector 112 may be stationary relative to the machine enclosure 106. In this manner, the optical fibers 116 of the first plurality of optical fibers 114 may remain substantially stationary throughout a build process, which may aid in avoiding stresses on the optical fibers and/or connections or couplings of the optical fibers, which can lead to failure of the optical fibers. The optical fibers 120 of the second plurality of optical fibers 118 may be movable relative to the stationary optical fiber connector 112 by virtue of their coupling to the movable optics assembly 104. While such movement may impart stresses onto the optical fibers and/or connections or couplings of the optical fibers, aspects described herein may facilitate rapid and simple replacement of the optical fibers 120, as discussed above and in more detail below.

Figure 2:
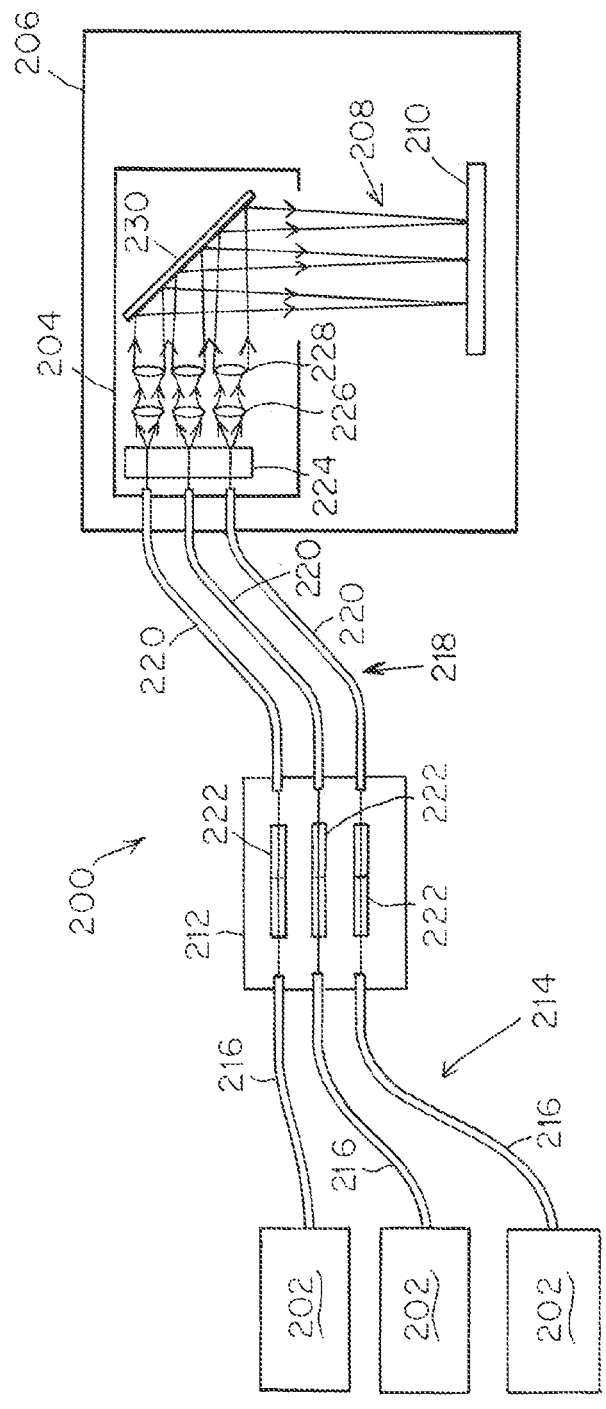
FIG. 2 is a schematic representation of an additive manufacturing system including fusion splices within an optical fiber connector, according to one embodiment.

FIG. 2 is a schematic representation of another embodiment of an additive manufacturing system 200. Similar to the embodiment discussed above in connection with FIG. 1, the system 200 includes a plurality of laser energy sources 202 coupled to an optics assembly 204 within a machine enclosure 206 via an optical fiber connector 212. A first plurality of optical fibers 214 extends between the laser energy sources 202 and the optical fiber connector 212, and a second plurality of optical fibers 218 extends between the optical fiber connector 212 and the optics assembly 204. In particular, each optical fiber 216 of the first plurality of optical fibers is coupled to a laser energy source 202 and a corresponding optical fiber 220 of the second plurality of optical fibers 218. In the depicted embodiment, optical fibers 216 are coupled to corresponding optical fibers 220 via fusion splices 222 within the optical fiber connector 212.

Moreover, the optical fibers 220 of the second plurality of optical fibers 218 are coupled to the optics assembly 204 via an alignment fixture 224 configured to define a desired spatial distribution of optical fibers to direct laser energy into the optics assembly. For example, the alignment fixture may comprise a block having a plurality of v-grooves or holes to which ends of each of the optical fibers 220 are bonded. The alignment fixture may be aligned with the optics assembly in a single alignment operation to align all of the optical fibers 220 of the second plurality of optical fibers 218 with the optics assembly 204. Consequently, separate alignment operations for each optical fiber 220 (corresponding to each laser energy source 202) may not be required, which may facilitate rapid replacement of the second plurality of optical fibers 218, if needed or otherwise desired (e.g., if one or more optical fibers 220 fails).

Additionally, FIG. 2 depicts exemplary optical elements that may be included in the optics assembly to direct laser energy from the second plurality of optical fibers 218 onto the build surface 210, and to form a desired array of laser energy 208 on the build surface. For example, the optics assembly may include beam forming optics such as lenses 226 and 228 and mirrors 230 which may shape and direct the laser energy within the optics assembly. In some embodiments, the lenses 226 and 228 may include one or more of micro-lens arrays, and objective lenses. For example, micro-lens arrays may be arranged to collimate the laser energy output from each optical fiber 220 and transform the beam shape of the laser energy, and objective lenses may be arranged to define a focal length for the combined array of laser energy and serve to demagnify the output from the micro-lens array. In some instances, this demagnification may be used to adjust the spacing of laser energy pixels in the array of laser energy formed on the build surface. For example, the objective lenses may be arranged to demagnify the array such that there is no spacing between adjacent pixels. Moreover, it should be understood that the current disclosure is not limited to any particular shape and/or arrangement of laser energy pixels in the array of laser energy 208 formed on the build surface. For example, the array may be a rectangular array with regularly spaced pixels of laser energy, or the array may be an irregular shape with non-uniform spacing between pixels.

Figure 3:
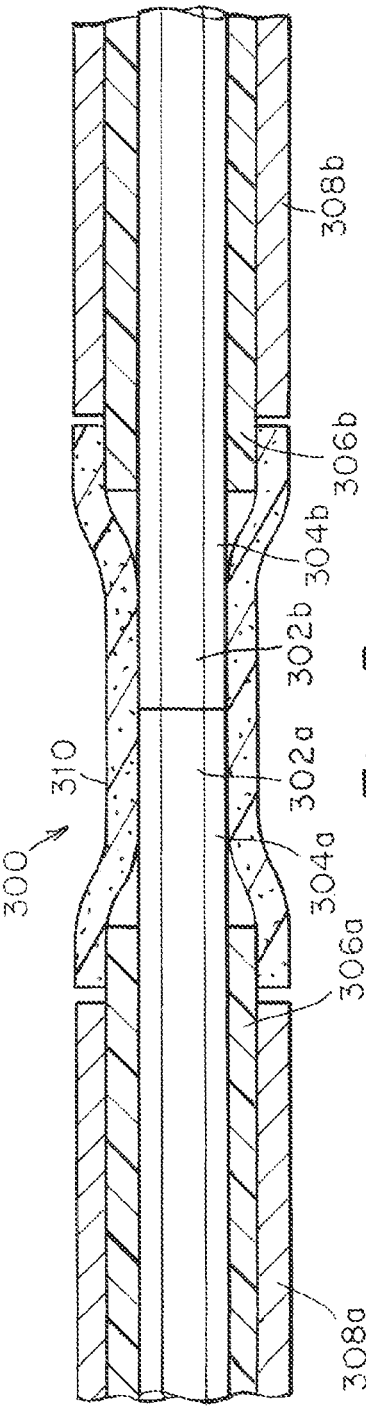
FIG. 3 is a schematic cross-sectional representation of fusion splice, according to some embodiments.

Referring now to FIG. 3, an exemplary embodiment of a fusion splice 300, which may be used to couple optical fibers within an optical fiber connector, is described in more detail. In particular, FIG. 3 shows a schematic cross-sectional view of a fusion splice that couples a first core 302a of a first optical fiber to a second core 302b of a second optical fiber. In some instances, the fusion splice 300 may be formed by stripping a shielding layer 308a and 308b (e.g., a metal shielding layer) and a protective layer 306a and 306b (e.g. a plastic layer) from the ends of each optical fiber. The ends of each fiber may be cleaved with an optical fiber cleaver that is configured to form optically flat surfaces at the ends of each fiber that are perpendicular to the longitudinal axis of each fiber. The cleaved ends of each fiber may be pressed into contact and fused together, e.g., via application of localized heating. After being fused, the exposed ends of the fibers, including the cores 302a and 302b as well as cladding layers 304a and 304b around the cores, may be covered by a protective sleeve 310, for example, a heat shrink tube or mechanically crimped tube. In some instances, fusing two fibers together via such a fusion splice may not require realignment of the other ends of the optical fibers, and moreover, the spliced region may be optically indistinguishable from virgin optical fiber such that the presence of the splice does not impact the optical transmission of the fibers.

In some embodiments, a fusion splice such as splice 300 shown in FIG. 3 may provide an opportunity to direct light that may undesirably be travelling in the cladding layers 304a and 304b from the fibers. Such light travelling in the cladding may arise from misalignments of an optical source with the optical fiber such that not all of the incident light is directed into the cores 302a or 302b. By tuning the refractive index of the protective sleeve to be less than that of the cladding 304a and 304b, any light travelling in the cladding can be directed out of the fibers through the protective sleeve 310. In some cases, this light may cause heating in the optical fiber connector where the fusion splice is formed, and thus in some embodiments, an optical fiber connector may include cooling structures such as cooling channels configured to direct chilled coolant fluid (e.g. water) through the optical fiber connector to remove heat associated light travelling in and directed out of the cladding via the protective sleeve.

Figure 4:
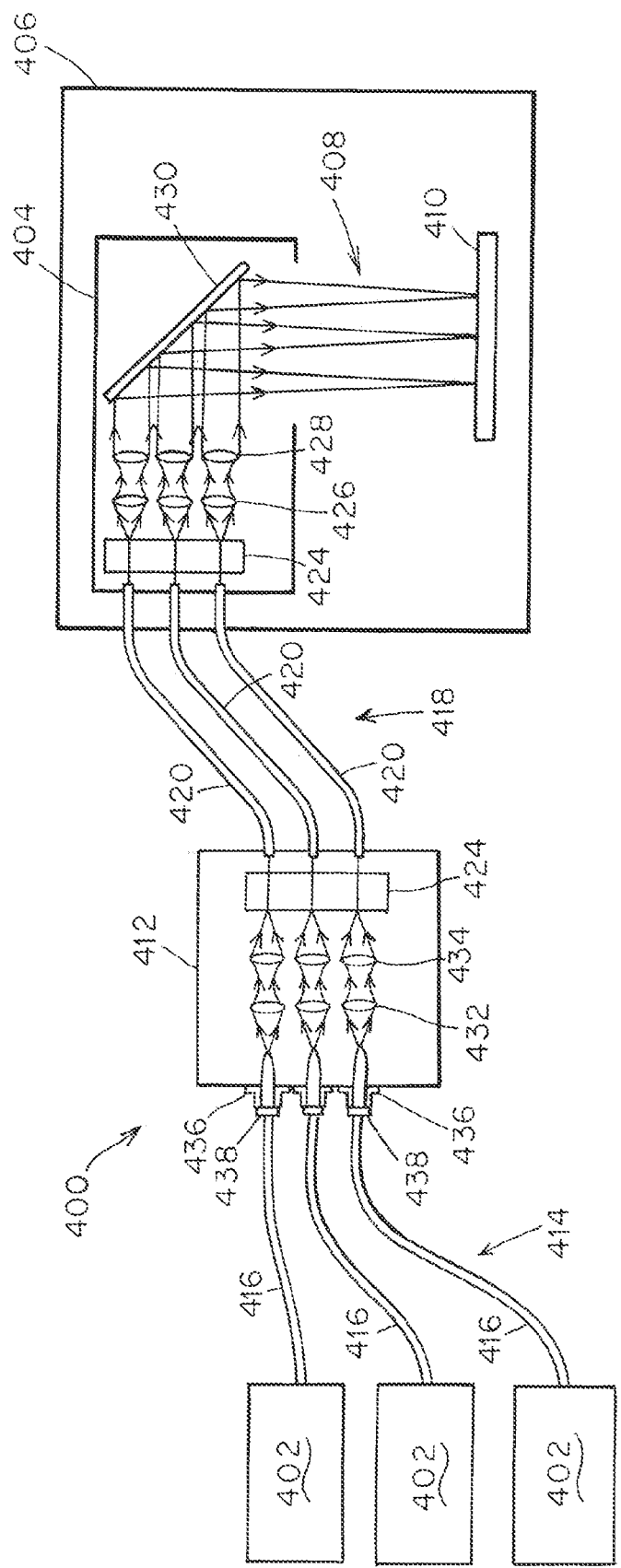
FIG. 4 is a schematic representation of an additive manufacturing system including high power optical fiber connectors, according to one embodiment.

Referring now to FIG. 4, another embodiment of an additive manufacturing system 400 is described in more detail. Similar to the embodiments discussed above, the system 400 includes a plurality of laser energy sources 402 optically coupled to an optics assembly 404 positioned within a machine enclosure 406. The optics assembly may include optics elements 426, 428, and 430 configured to form an array of laser energy 408 on a build surface 410 within the machine enclosure 406. The optics assembly 404 is coupled to the laser energy sources 402 via an optical fiber connector 412. As illustrated, a first plurality of optical fibers 414 extends between the laser energy sources 402 and the optical fiber connector 412, and a second plurality of optical fibers 418 extends between the optical fiber connector 412 and the optics assembly 404. In particular, each optical fiber 416 of the first plurality of optical fibers is coupled to a laser energy source 402 and a corresponding optical fiber 420 of the second plurality of optical fibers 418, which are coupled to the optics assembly 404 via an alignment fixture at a first end of the second plurality of optical fibers 418.

In this embodiment, each optical fiber 416 of the first plurality of optical fibers 414 is coupled to the optical fiber connector 412 via a high power fiber coupler, such as a QBH and/or LLK type coupler. In particular, an end of each fiber 416 is attached to a coupler 438, which is received in a receiver 436 coupled to the optical fiber connector. Light exiting through the coupler 438 is focused onto second ends of fibers 420 of the second plurality of optical fibers 418, which may be held in an alignment fixture 424 coupled to the optical fiber connector. For example, the light may be focused into the fibers via suitable beam forming optics 432 and 434. Since the optical fiber connector 412 is positioned externally to the machine enclosure 406 and separate from the optics assembly 404, any added weight or bulk associated with the couplers 438 and receivers 436 does not impact the operation of the optics assembly 404.

In some instances, such arrangements may allow for simple and rapid replacement of a failed laser energy source 402. For example, a failed laser energy source may be replaced by decoupling a coupler 438 at the end of an optical fiber 416 associated with the failed laser energy source, and coupling a coupler 438 associated with a replacement laser energy source in its place. In some cases, the replacement coupler 438 may be aligned with the beam forming optics 432, 434 in the optical connector assembly upon replacing a laser.

Figure 5:
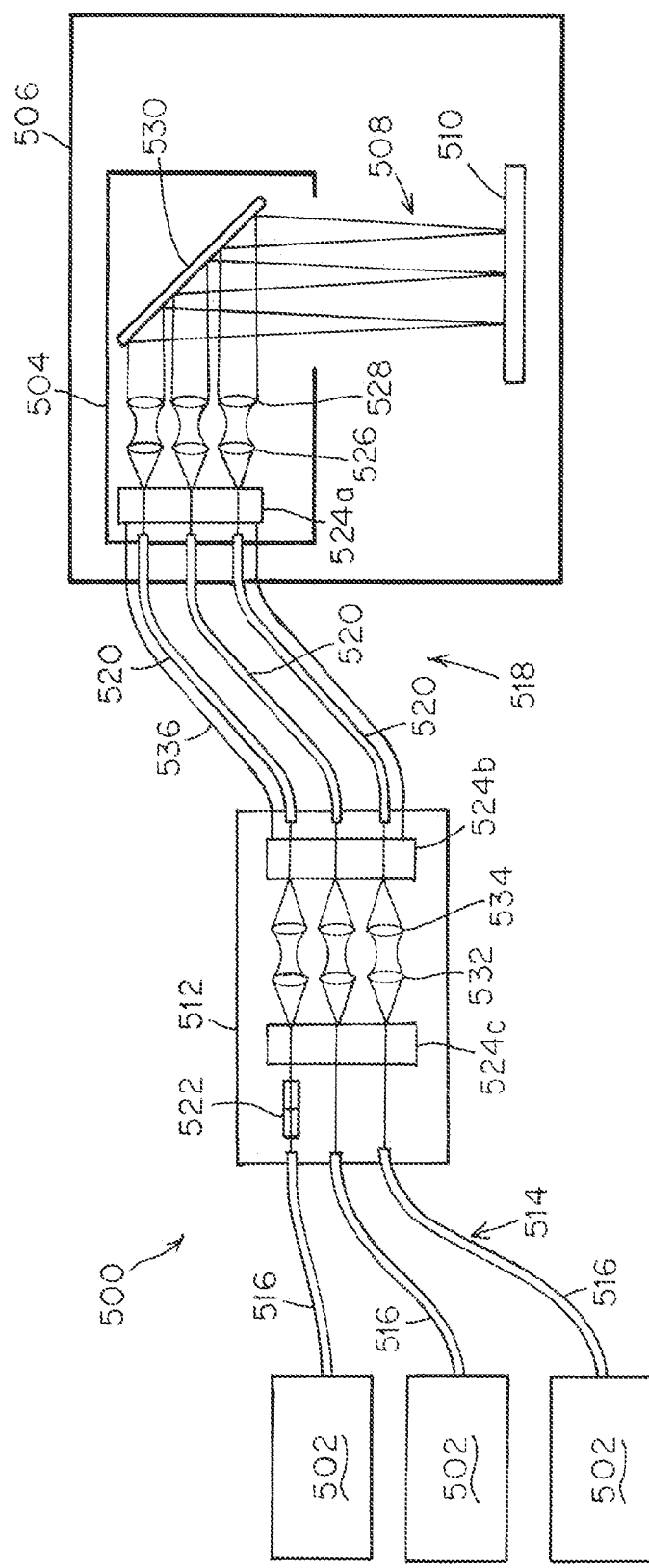
FIG. 5 is a schematic representation of an additive manufacturing system, according to one embodiment.

FIG. 5 depicts a further embodiment of an additive manufacturing system 500 similar to the embodiments discussed above. In particular, the system 500 includes a plurality of laser energy sources 502 optically coupled to an optics assembly 504 positioned within a machine enclosure 506. The optics assembly may include optics elements 526, 528, and 530 configured to form an array of laser energy 508 on a build surface 510 within the machine enclosure 506. The optics assembly 504 is coupled to the laser energy sources 502 via an optical fiber connector 512. As illustrated, a first plurality of optical fibers 514 extends between the laser energy sources 502 and the optical fiber connector 512, and a second plurality of optical fibers 518 extends between the optical fiber connector 512 and the optics assembly 504. In this embodiment, each optical fiber 520 of the second plurality of optical fibers is positioned within an optical cable 536 extending between the optical fiber connector 512 and the optics assembly 504. Moreover, each optical fiber 516 of the first plurality of optical fibers is coupled to a laser energy source 502 and a corresponding optical fiber 520 of the second plurality of optical fibers 518. The optical cable 536 containing the second plurality of optical fibers 518 is coupled to the optics assembly 504 via a first alignment fixture 524a at a first end of the optical cable 536, and the cable is coupled to the optical fiber connector 512 via a second alignment fixture 524b at a second end of the optical cable 536.

Additionally, the optical fiber connector 512 in FIG. 5 includes a third alignment fixture 524c associated with the first plurality of optical fibers 514 extending between the laser energy sources 502 and the optical fiber connector 512. This alignment fixture may be aligned with beam forming elements 532 and 534 within the optical fiber connector such that light leaving the third alignment fixture 524c is directed into the ends of the optical fibers 520 held in the second alignment fixture 524b. Moreover, the optical fiber connector 512 may include one or more fusion splices 522 positioned between the laser energy sources 502 and the third alignment fixture 524c. In this manner, a failed laser energy source 502 may be replaced by cleaving its corresponding optical fiber 516 and forming a fusion splice 522 with an optical fiber 516 of a replacement laser energy source 502. As noted above, a fusion splice may be formed without requiring alignment of the respective optical fibers within the splice, and since the third alignment fixture 524c maintains the alignment of the first plurality of optical fibers 514, such arrangements may allow laser energy sources to be replaced without requiring any additional alignment processes. Moreover, in some instances, the optical fiber connector 512 may include one or more cooling structures (not depicted) associated with the fusion splices 522.

While the embodiments depicted in FIGS. 1-2 and 4-5 show systems including three laser energy sources, it should be understood that the current disclosure is not limited to any particular number of laser energy sources. Accordingly, the embodiments described herein may be implemented with more than three laser energy sources, such as tens, hundreds, or thousands of laser energy sources.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Accordingly, while the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

What is claimed is:

1. A method of exchanging optical fibers in an additive manufacturing system, the method comprising:
   decoupling a first plurality of optical fibers from an optical fiber connector, wherein:
      the first plurality of optical fibers extends between the optical fiber connector and an optics assembly of the additive manufacturing system,
      the optics assembly is configured to direct laser energy from each laser energy source of a plurality of laser energy sources of the additive manufacturing system,
      the optical fiber connector is configured to transmit the laser energy from each laser energy source, and
      the laser energy from each laser energy source to have a power level sufficient to fuse at least a portion of a material on a build surface of the additive manufacturing system;
   decoupling the first plurality of optical fibers from the optics assembly;

coupling a plurality of replacement optical fibers to the optical fiber connector such that each of the plurality of replacement optical fibers is coupled to a laser energy source of the plurality of laser energy sources via the optical fiber connector; and coupling the plurality of replacement optical fibers to the optics assembly.

2. The method of claim 1, wherein each laser energy source of the plurality of laser energy sources is coupled to the optical fiber connector via an optical fiber of a second plurality of optical fibers, and wherein coupling the plurality of replacement optical fibers to the optical fiber connector comprises coupling each replacement optical fiber of the plurality of replacement optical fibers to an optical fiber of the second plurality of optical fibers within the optical fiber connector.

3. The method of claim 1, wherein the first plurality of optical fibers is configured as an optical fiber cable, and the plurality of replacement optical fibers are configured as a replacement optical fiber cable.

4. The method of claim 3, wherein the optical fiber cable has a first end and a second end, the first end is selectively removable from the optical fiber connector and the second end is selectively removable from the optics assembly.

5. The method of claim 3, wherein the first plurality of optical fibers is aligned in an array at each of first and second ends of the optical fiber cable, and the plurality of replacement optical fibers is aligned in an array at each of first and second ends of the replacement optical fiber cable.

6. The method of claim 3, wherein:
first and second ends of the first plurality of optical fibers are aligned within first and second alignment fixtures, respectively, positioned at first and second ends of the optical fiber cable, and first and second ends of the plurality of replacement optical fibers are aligned within third and fourth alignment fixtures, respectively, positioned at first and second ends of the replacement optical fiber cable.

7. The method of claim 6, wherein decoupling the first plurality of optical fibers from the optical fiber connector comprises detaching the first alignment fixture from the optical fiber connector, and wherein decoupling the first plurality of optical fibers from the optics assembly comprises detaching the second alignment fixture from the optics assembly.

8. The method of claim 6, wherein coupling the plurality of replacement optical fibers to the optical fiber connector comprises attaching the third alignment fixture to the optical fiber connector, and wherein coupling the plurality of replacement optical fibers to the optics assembly comprises attaching the fourth alignment fixture to the optics assembly.

9. The method of claim 1, wherein:
the build surface and the optics assembly are positioned within an enclosed build volume of the additive manufacturing system, the plurality of laser energy sources and the optical fiber connector are positioned outside of the enclosed build volume, a position of the optical fiber connector is fixed relative to a position of the plurality of laser energy sources, and the optics assembly is moveable relative to the optical fiber connector.

10. The method of claim 1, wherein the plurality of laser energy sources comprises at least 10 laser energy sources.

11. The method of claim 10, wherein the plurality of laser energy sources comprises at least 50 laser energy sources.

12. The method of claim 11, wherein the plurality of laser energy sources comprises at least 100 laser energy sources.

13. The method of claim 12, wherein the plurality of laser energy sources comprises at least 500 laser energy sources.

14. The method of claim 13, wherein the plurality of laser energy sources comprises less than 2000 laser energy sources.

15. The method of claim 1, wherein the optical fiber connector comprises one or more cooling passages.

16. The method of claim 1, wherein a power output of each laser energy source of the plurality of laser energy sources is between about 50 W and about 2 kW.

17. The method of claim 16, wherein a total power output from the plurality of laser energy sources is between about 0.5 kW and about 4,000 kW.

18. The method of claim 1, wherein the optical fiber connector is configured to transmit the laser energy from each laser energy source of the plurality of laser energy sources with a power output of each laser energy source between about 50 W and about 2 kW.

19. The method of claim 1, wherein the optical fiber connector is configured to transmit the laser energy from the plurality of laser energy sources with a total power output between about 0.5 kW and about 4,000 kW.

20. The method of claim 1, further comprising fusing at least a portion of the material on the build surface to form one or more parts.

21. A part manufactured using the method of claim 1.

* * * * *